(12) United States Patent
Thompson et al.

(10) Patent No.: US 10,092,875 B2
(45) Date of Patent: Oct. 9, 2018

(54) REMOVAL OF CONTAMINANTS FROM GAS USING ZEOLITE SSZ-36, ZEOLITE SSZ-39, OR ZEOLITE SSZ-45

(71) Applicant: Chevron U.S.A. Inc., San Ramon, CA (US)

(72) Inventors: Joshua Allen Thompson, Martinez, CA (US); Tracy Margaret Davis, Novato, CA (US); Dan Xie, Richmond, CA (US); Stacey Ian Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 123 days.

(21) Appl. No.: 15/408,533

(22) Filed: Jan. 18, 2017

(65) Prior Publication Data
US 2018/0200662 A1 Jul. 19, 2018

(51) Int. Cl.
*B01D 53/047* (2006.01)
*B01D 53/04* (2006.01)

(52) U.S. Cl.
CPC ....... *B01D 53/047* (2013.01); *B01D 53/0423* (2013.01); *B01D 2253/1085* (2013.01);
(Continued)

(58) Field of Classification Search
CPC .............. B01D 53/047; B01D 53/0423; B01D 2253/1085; B01D 2256/24; B01D 2256/245; B01D 2257/304; B01D 2257/308; B01D 2257/504; B01D 2257/80; B01D 2259/40028; B01D 2259/40041; B01D 2259/40045; B01D 2259/40052; B01D 2259/402; B01D 2259/404; B01D 2259/414
(Continued)

(56) References Cited

U.S. PATENT DOCUMENTS 100,053 A 2/1870 Miller
210,580 A 12/1878 Tuener
(Continued)

OTHER PUBLICATIONS

Y. Wang, M. D. LeVan, "Adsorption Equilibrium of Binary Mixtures of Carbon Dioxide and Water Vapor on Zeolites 5A and 13X", J. Chem. Eng. Data, J. Chem. Eng. Data, 2010, 55, 3189-3195.
(Continued)

*Primary Examiner* — Frank M Lawrence, Jr.
(74) *Attorney, Agent, or Firm* — Susan M. Abernathy

(57) ABSTRACT

We provide a method for removing contaminants from a gas, comprising: alternating input of the gas between two or more beds of adsorbent particles that comprise zeolite SSZ-36, zeolite SSZ-39, or zeolite SSZ-45; wherein the gas contacts one of the beds during an adsorption and a tail gas is simultaneously vented from another of the beds by desorption; wherein a contacting pressure is from about 345 kPa to about 6895 kPa and produces a product gas containing no greater than about 2 mol % carbon dioxide, at least about 10 wppm water, at least about 65 mol % of methane recovered from the feed gas, and at least about 25 mol % of ethane recovered from the feed gas; and wherein the tail gas is vented from the feed end of the beds. We also provide a method for removing a contaminant from a gas, wherein the gas contains hydrogen sulfide.

23 Claims, 12 Drawing Sheets

(52) U.S. Cl.
CPC .... *B01D 2256/24* (2013.01); *B01D 2256/245* (2013.01); *B01D 2257/304* (2013.01); *B01D 2257/308* (2013.01); *B01D 2257/504* (2013.01); *B01D 2257/80* (2013.01); *B01D 2259/402* (2013.01); *B01D 2259/404* (2013.01); *B01D 2259/40028* (2013.01); *B01D 2259/40041* (2013.01); *B01D 2259/40045* (2013.01); *B01D 2259/40052* (2013.01); *B01D 2259/40069* (2013.01); *B01D 2259/414* (2013.01)

(58) Field of Classification Search
USPC ...... 95/96–98, 103, 136, 139; 423/230, 700, 423/706
See application file for complete search history.

(56) References Cited

U.S. PATENT DOCUMENTS

| | | | |
|---|---|---|---|
| 4,544,538 A | 10/1985 | Zones | |
| 4,925,460 A | 5/1990 | Coe et al. | |
| 5,939,044 A | 8/1999 | Nakagawa et al. | |
| 5,958,370 A | 9/1999 | Zones et al. | |
| 6,033,643 A | 3/2000 | Yuen et al. | |
| 6,068,682 A | 5/2000 | Kuznicki et al. | |
| 6,488,741 B2 | 12/2002 | Olson | |
| 6,497,750 B2 | 12/2002 | Butwell et al. | |
| 6,709,644 B2 | 3/2004 | Zones et al. | |
| 8,926,735 B1 | 1/2015 | Xie et al. | |
| 9,610,534 B1 * | 4/2017 | Thompson | B01D 53/0476 |
| 9,737,846 B2 * | 8/2017 | Carstensen | B01J 20/183 |
| 2008/0159936 A1 * | 7/2008 | Zones | B01D 53/945 423/213.5 |
| 2016/0001260 A1 * | 1/2016 | Tour | B01J 20/2808 95/139 |
| 2016/0175759 A1 | 6/2016 | Carstensen et al. | |

OTHER PUBLICATIONS

Hudson et al., National Institute of Standards and Technology, "Unconventional, Highly Selective CO2 Adsorption in Zeolite SSZ-13", Journal of the American Chemical Society, 2012, vol. 134, Pg., Journal of the American Chemical Society, 2012, vol. 134, p. 1970-1973.

M. Luberti, D. Friedrich, S. Brandani, H. Ahn, "Design of a H2 PSA for Cogeneration of Ultrapure Hydrogen and Power at an Advanced Integrated Gasification Combined Cycle with Pre-combustion Capture", Adsorption, 2014, 20, 511-524. http://rd.spri, Adsorption, 2014, 20, 511-524.

* cited by examiner

REMOVAL OF CONTAMINANTS FROM GAS USING ZEOLITE SSZ-36, ZEOLITE SSZ-39, OR ZEOLITE SSZ-45

TECHNICAL FIELD

This application is directed to methods for removing contaminants including water, from a feed stream of gas that comprises the contaminants, methane, and ethane.

BACKGROUND

Improved processes and equipment are needed for removing contaminants from gas. Natural gas can contain significant levels of contaminants, such as water, carbonyl sulfide, hydrogen sulfide, carbon dioxide, nitrogen, and mercaptans. Synthesis gas can contain significant levels of contaminants, such as carbon dioxide, hydrogen sulfide, water, nitrogen, ammonia, oxides of nitrogen, and oxides of sulfur. It is desired to remove these contaminants from the gas and selectively retain the methane and the ethane in a product gas stream.

It is desired to have a pressure swing adsorption process that uses alternative adsorbent materials that produce a product gas stream containing low amounts of carbon dioxide, reduced amounts of water, while also retaining significant amounts of the methane and ethane from the feed gas stream.

SUMMARY

This application provides a method for removing a contaminant comprising a water from a feed gas stream that includes the contaminant, a methane and an ethane, comprising:

alternating an input of the feed gas stream between an at least two beds of one or more adsorbent particles made from a homogeneous mixture, wherein the adsorbent particles comprise a zeolite SSZ-36, a zeolite SSZ-39, a zeolite SSZ-45, or a combination thereof;

wherein the feed gas stream contacts one of the at least two beds at a given time by an adsorption step and a tail gas stream is simultaneously vented from another of the at least two beds by a desorption step;

wherein a contacting in the one of the at least two beds occurs at a feed pressure of from about 345 kPa to about 6895 kPa for a sufficient time to preferentially adsorb the contaminant from the feed gas stream and thereby producing a product gas stream containing no greater than about 2 mol % carbon dioxide, at least about 10 wppm of the water, at least about 65 mol % of the methane recovered from the feed gas stream, and at least about 25 mol % of the ethane recovered from the feed gas stream; and wherein the feed gas stream is input at a feed end of each of the at least two beds, the product gas stream is removed from a product end of each of the at least two beds, and the tail gas stream is vented from the feed end of the at least two beds.

This application also provides a method for removing a contaminant from a feed gas stream, wherein the feed gas stream includes a methane, an ethane, a carbon dioxide, from 20 to 10,000 wppm water, and from 4 to 1000 wppm hydrogen sulfide, comprising:

alternating an input of the feed gas stream between an at least two beds of one or more adsorbent particles made from a homogeneous mixture, wherein the adsorbent particles comprise a zeolite SSZ-36, a zeolite SSZ-39, a zeolite SSZ-45, or a combination thereof;

wherein the feed gas stream contacts one of the at least two beds at a given time in an adsorption step and a tail gas stream is simultaneously vented from another of the at least two beds in a desorption step;

wherein a contacting in the one of the at least two beds occurs at a feed pressure of from about 345 kPa to about 6895 kPa for a sufficient time to preferentially adsorb the contaminant from the feed gas stream; thereby producing a product gas stream containing no greater than about 2 mol % carbon dioxide, at least about 10 wppm of the water, at least about 65 mol % of the methane recovered from the feed gas stream, at least about 25 mol % of the ethane recovered from the feed gas stream, no greater than about 1 wppm of the hydrogen sulfide, and no greater than about 1 wppm carbonyl sulfide; and wherein the feed gas stream is input at a feed end of each of the at least two beds, the product gas stream is removed from a product end of each of the at least two beds, and the tail gas stream is vented from the feed end of the at least two beds.

The present invention may suitably comprise, consist of, or consist essentially of, the elements in the claims, as described herein.

GLOSSARY

Figure 1:
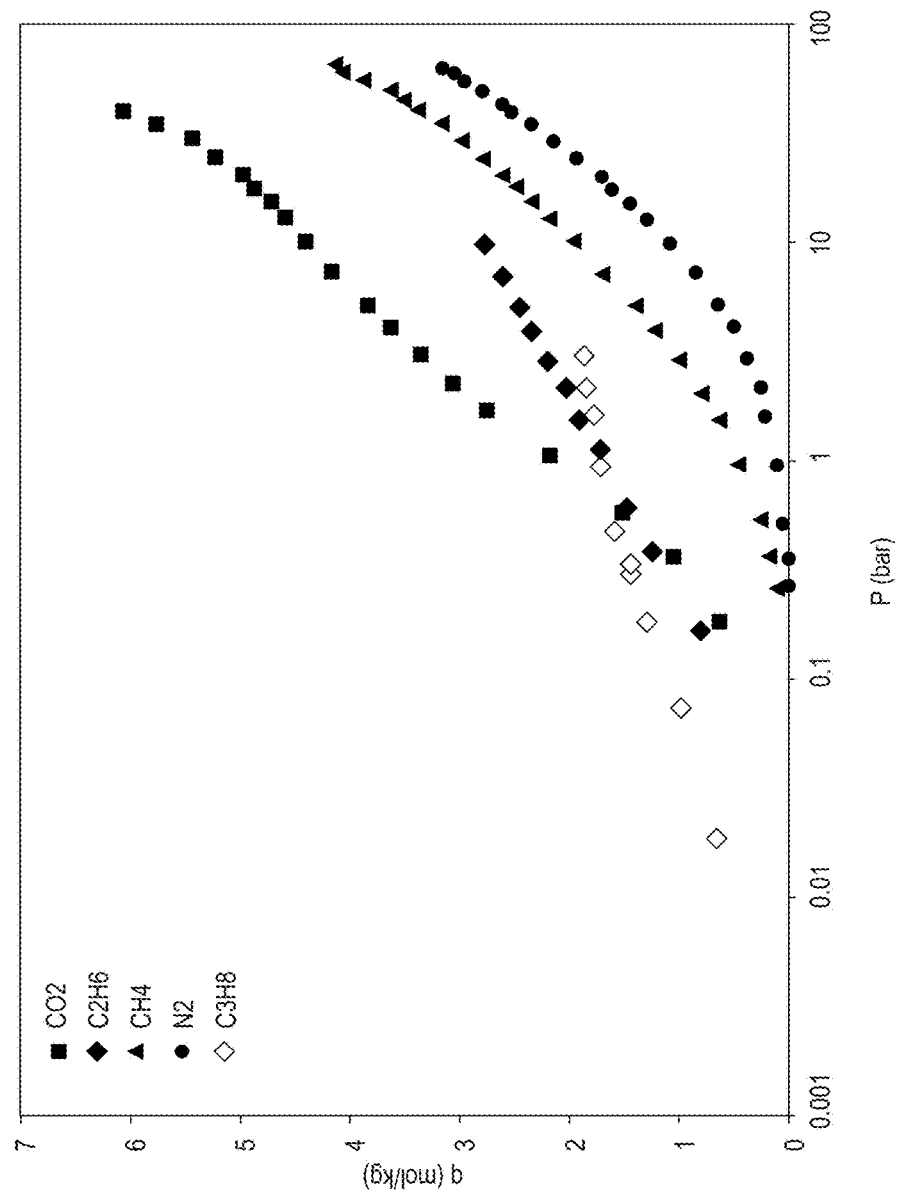
FIG. 1 is a plot of the equilibrium adsorption results for $CO_2$, $C_2H_6$, $CH_4$, $N_2$, and $C_3H_8$, on SSZ-36 at 30° C.

A "natural gas" is a gas that is comprised primarily of methane, and which when properly processed can be used as fuel by residential, commercial, or industrial consumers.

A "synthesis gas" is a gas that contains at least carbon monoxide and hydrogen. Other molecular components in synthesis gas can include methane, ethane, carbon dioxide, hydrogen sulfide, water, nitrogen, ammonia, oxides of nitrogen, and oxides of sulfur.

"Acid gas" refers to acid forming gaseous contaminants that can be found in natural gas or synthesis gas. These gaseous contaminants include one or more of carbon dioxide, hydrogen sulfide, carbonyl sulfide, oxides of nitrogen, and oxides of sulfur.

"Carbonyl sulfide" is the organic compound with the formula OCS. Commonly written as COS, it is a colourless flammable gas with an unpleasant odor. It is a linear molecule consisting of a carbonyl group double bonded to a sulfur atom. Carbonyl sulfide can be considered to be intermediate between carbon dioxide and carbon disulfide, both of which are valence isoelectronic with it.

"Million standard cubic feet" (MMSCF) and "Million standard cubic feet per day" (MMSCFD) are units of measurement for gases that are predominantly used in the United States. A related unit of measure to MMSCFD is "mega standard cubic meters per day" ($MSm^3/d$), which is equal to 106 $Sm^3/d$ used in many countries outside the United States. One MMSCFD equals 1180 $Sm^3/h$.

"Block valve" refers to a valve that can prevent motion or allow motion to happen without restriction. This means that the valve must have no effect on movement in the off position and totally block movement in the on position. The most common type of block valve is the simple gate valve although there are hundreds of different variations.

DETAILED DESCRIPTION

The methods of the present disclosure use alternative adsorbent particles that comprise a zeolite SSZ-36, a zeolite SSZ-39, a zeolite SSZ-45, or a combination thereof, to remove the contaminants from a feed gas stream. Zeolites are crystalline solids structures made of silicon, aluminum and oxygen that form a framework with cavities and channels inside where cations, water and/or small molecules may reside. Zeolites are crystalline aluminosilicates with open 3D framework structures built of $SiO_4$ and $AlO_4$ tetrahedra linked to each other by sharing all the oxygen atoms to form regular intra-crystalline cavities and channels of molecular dimensions. A defining feature of zeolites is that their frameworks are made up of 4-coordinated atoms forming tetrahedra. These tetrahedra are linked together by their corners and make a rich variety of beautiful structures. The framework structure may contain linked cages, cavities or channels, which are big enough to allow small molecules to enter. The system of large voids explains the consistent low specific density of these compounds. The aluminosilicate framework is negatively charged and can attract positive cations that reside in the cages as a framework ion and can compensate for the negative charge of the framework.

Zeolite SSZ-36 is a synthetic zeolite formed as an intergrowth of ITE and RTH zeolites. ITE and SSZ-36 are more fully described in U.S. Pat. No. 5,939,044. A method used to make zeolite SSZ-36 is disclosed in U.S. Pat. No. 6,218,591. Zeolite SSZ-39 is a synthetic zeolite of the AEI structure type, and is described in U.S. Pat. No. 5,958,370. Zeolite SSZ-45 is a synthetic zeolite of the EEI structure type, and is described in U.S. Pat. No. 6,033,643. A method used to make SSZ-45 is disclosed in U.S. Pat. No. 8,926,735.

In one embodiment, the adsorbent particles have a Si:Al mole ratio of 5 or greater. In one embodiment, the zeolite SSZ-36 has a Si:Al mole ratio of 5 or greater, such as from 5 to 100. In one embodiment, the zeolite SSZ-39 has a Si:Al mole ratio of 5 or greater, such as from 5 to 100. In one embodiment, the zeolite SSZ-45 has a Si:Al mole ratio of 50 or greater, such as from 50 to 500, or from 101 to 400.

The adsorbent particles are made from a homogeneous mixture and are not coated particles or made from layers of different materials. An example of how these adsorbent particles can be made is when the adsorbent particles are pressed into pellets from a powder. In one embodiment, the zeolite is mixed with a catalyst support and the zeolite and the catalyst support are ground together into a powder that is a homogeneous mixture. In one embodiment the catalyst support is alumina, such as a pseudo-Boehmite alumina powder. The catalyst support can be inert or can participate in the adsorption performed by the adsorbent particles. Typical catalyst supports include various kinds of carbon, alumina, and silica. In one embodiment, the catalyst support comprises an amorphous silica aluminate. In one embodiment, the catalyst support comprises an amorphous silica aluminate and a second support material.

Examples of the catalyst support or the second support material (when used), can include kieselguhr, alumina, silica, and silica-alumina. Other examples include alumina-boria, silica-alumina-magnesia, silica-alumina-titania and materials obtained by adding other zeolites and other complex oxides thereto. In one embodiment, the catalyst support is porous, and comprises a natural clay or a synthetic oxide. The catalyst support can be selected to provide adequate mechanical strength and chemical stability at the contacting conditions under which the adsorbent particles are employed.

In one embodiment, the catalyst support or the second support material comprises a pseudo-boehmite alumina. Examples of pseudo-boehmite alumina are CATAPAL® high purity aluminas. CATAPAL® is a registered trademark of SASOL. The pressed pellets can be broken and sieved to obtain the desired mesh size. In one embodiment, the powder X-ray diffraction (XRD) pattern of the pressed pellets is the same as the original XRD pattern of the zeolite powder prior to it having been pressed into a pellet.

In one embodiment, the zeolite SSZ-36, the zeolite SSZ-39, or the zeolite SSZ-45 has a cation as a framework ion. The cation can be selected from the group consisting of a sodium, a calcium, a potassium, a lithium, a magnesium, a barium, and combinations thereof. In one embodiment, the cation is sodium.

In one embodiment, the feed gas stream is a natural gas that includes an acid gas, a water, a methane, and an ethane. In one embodiment, the feed gas stream comprises a carbon dioxide, from 20 to 5000 wppm of the water, and from 0 to 1000 wppm hydrogen sulfide. In one embodiment, the feed gas stream comprises at least about 20 wppm of the water, at least about 95 mol % total-methane, and at least about 3 mol % total-ethane. In one embodiment, the feed gas stream includes a methane, a ethane, a carbon dioxide, from 20 to 10,000 wppm water, and from 4 to 1000 wppm hydrogen sulfide.

In one embodiment, the feed gas stream comprises an acid gas selected from the group consisting of a carbon dioxide, a hydrogen sulfide, a carbonyl sulfide, and combinations thereof.

The method comprises alternating an input of the feed gas stream between at least two beds of the one or more adsorbent particles. The feed gas stream contacts one of the at least two beds at a given time by an adsorption step and a tail gas stream is simultaneously vented from another of the at least two beds by a desorption step.

In one embodiment, the feed gas stream has a flow rate less than 200 MMSCFD, such as from 1 to 100 MMSCFD, during the adsorption. In one embodiment, the adsorption occurs at an adsorption-temperature less than 90° C., such as from 20° C. to 80° C.

The feed gas stream is input at a feed end of each of the at least two beds, the product gas stream is removed from a product end of each of the at least two beds, and the tail gas stream is vented from the feed end of the at least two beds.

In one embodiment, a portion of the tail gas stream can be recycled to the feed gas stream. In one embodiment, the recycling of the tail gas stream to the feed gas stream can increase the recoveries of methane and ethane by at least 1 mol %. In one embodiment, the recycling can also lower the total vacuum requirements and gas compression costs. For example, wherein from greater than 0 wt % to about 50 wt % of the tail gas stream is recycled to the feed gas stream, this can thereby produce the product gas stream containing no greater than about 2 mol % carbon dioxide, at least about 90 mol % of the methane in the feed gas stream, and at least about 85 mol % of total hydrocarbons in the feed gas stream.

The contacting in the one of the at least two beds occurs at a feed pressure of from about 345 kPa to about 6895 kPa for a sufficient time to preferentially adsorb the contaminant from the feed gas stream and thereby producing the product gas stream. In one embodiment, the contacting produces the product gas stream containing no greater than about 2 mol % carbon dioxide, at least about 10 wppm of the water, at least about 65 mol % of the methane recovered from the feed gas stream, and at least about 25 mol % of the ethane recovered from the feed gas stream. In one embodiment, the contacting produces the product gas stream containing no greater than about 2 mol % carbon dioxide, at least about 10 wppm of the water, at least about 65 mol % of the methane recovered from the feed gas stream, at least about 25 mol % of the ethane recovered from the feed gas stream, no greater than about 1 wppm of the hydrogen sulfide, and no greater than about 1 wppm carbonyl sulfide. In one embodiment, the product gas stream contains at least about 80 mol %, such as from 80 to 99 mol %, of the methane recovered from the feed gas stream and at least about 40 mol %, such as from 40 to 95 mol %, of the ethane recovered from the feed gas stream.

In one embodiment, the product gas stream contains no greater than about 50 wppm hydrogen sulfide. In one embodiment, the product gas stream contains no greater than about 4 wppm hydrogen sulfide and no greater than about 2000 wppm of the water.

Figure 8:
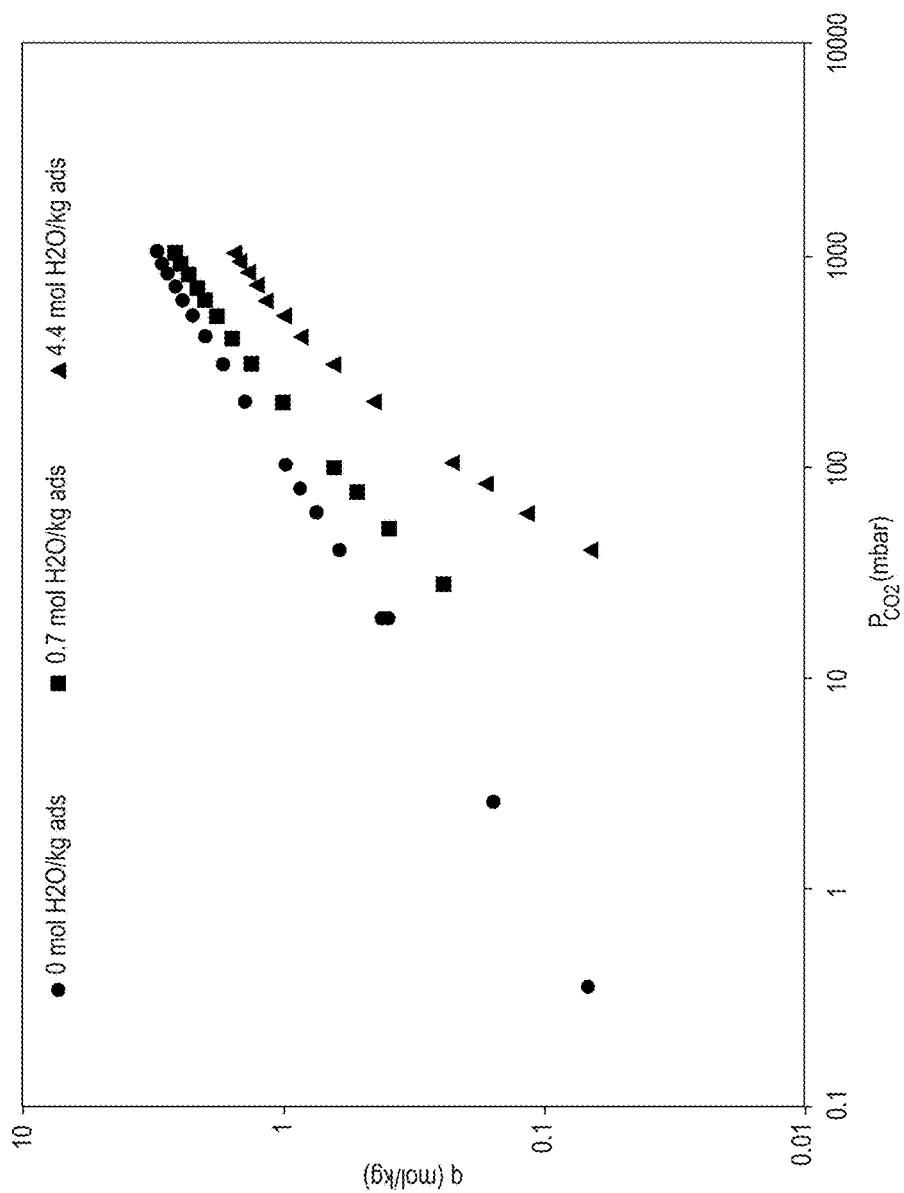
FIG. 8 is a chart of plots of $CO_2$ adsorption on SSZ-39 from gas feeds over a range of pressures and with varying amounts of $H_2O$ adsorbed.

Water in the feed gas stream is adsorbed by the at least two beds. In one embodiment, the water is adsorbed by the at least two beds of the one or more adsorbent particles and a $CO_2$ adsorption capacity of the one or more beds is not substantially decreased. In one embodiment, the $CO_2$ adsorption capacity is lowered by from 2 to 40 mol % when the feed gas stream comprises from 0.5 to 5 moles of $H_2O$ per kg adsorbent from the feed gas stream. In one embodiment, the $CO_2$ adsorption capacity of the one or more adsorbent particles is lowered by less than 30 mol %. This feature is shown in FIG. 8.

Figure 9:
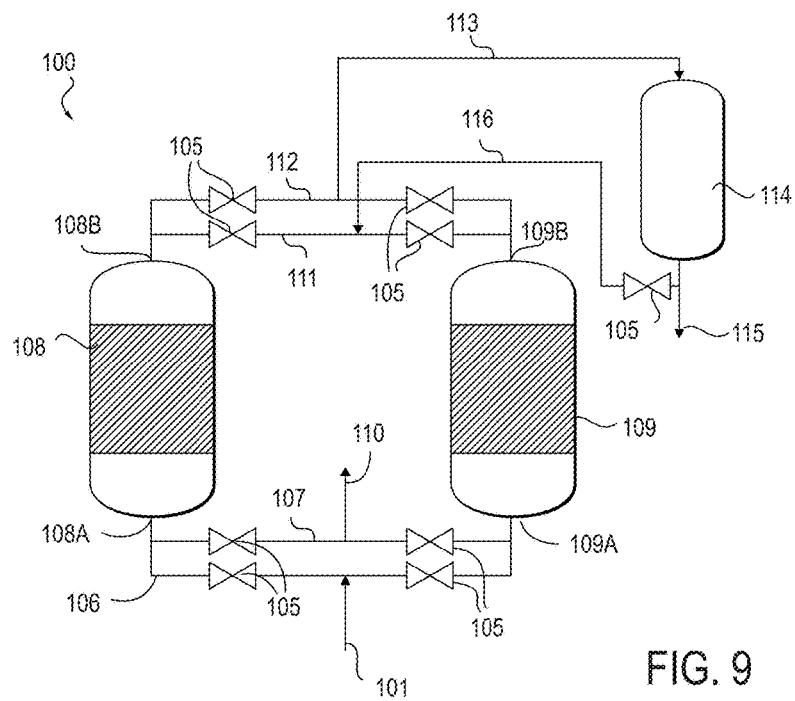
FIG. 9 is a schematic diagram illustrating a two bed pressure swing adsorption (PSA) system.

Referring to FIG. 9, here is shown an exemplary two bed PSA system (100) with two beds. In this figure, a feed gas stream (101) is introduced into line (106) having block valves (105) therein. Line (106) connects the first inlet end (108A) to the first adsorption column (108), and also connects the second inlet end (109A) to the second adsorption column (109). A second line (107), is fluidly connected to line (106) and separately connects the first inlet end (108A) to the first adsorption column (108), and also connects the second inlet end (109A) to the second adsorption column (109). Second line (107) has an outlet for tail gas (110). The first adsorption column (108) contains the adsorbent particles described herein, and has a first product end (108B). The second adsorption column (109) also contains the adsorbent particles described herein, and has a second product end (109B). The first product end (108B) and the second product end (109B) are connected by a third line (111) and by a fourth line (112). The third line (111) and the fourth line (112) contain block valves (105). The fourth line (112) is connected with a fifth line (113), which delivers an intermediate product gas stream to a product gas buffer tank (114). The product gas buffer tank (114) allows for controlled purging and re-pressurization steps. The product gas stream (115) can be provided from the product gas buffer tank (114). The product gas buffer tank is controlled by one or more block valves (105) through a sixth line (116) that connects to the third line (111), as shown.

In one embodiment, wherein the method utilizes two beds of the one or more adsorbent particles, the method further comprises:

a. following the adsorption step in one of the two beds and a simultaneous desorption step in the other of the two beds, equalizing a pressure of the two beds through the product end of each of the two beds at the end of the adsorption and the simultaneous desorption step; and b. re-pressurizing the bed having just completed the simultaneous desorption step by sending a slipstream of the product gas stream through the product end of the bed having just completed the simultaneous desorption step.

In one embodiment, the at least two beds of the one or more adsorbent particles are four beds of the one or more adsorbent particles. This feature is shown in FIG. 11 and FIG. 12.

Figure 11:
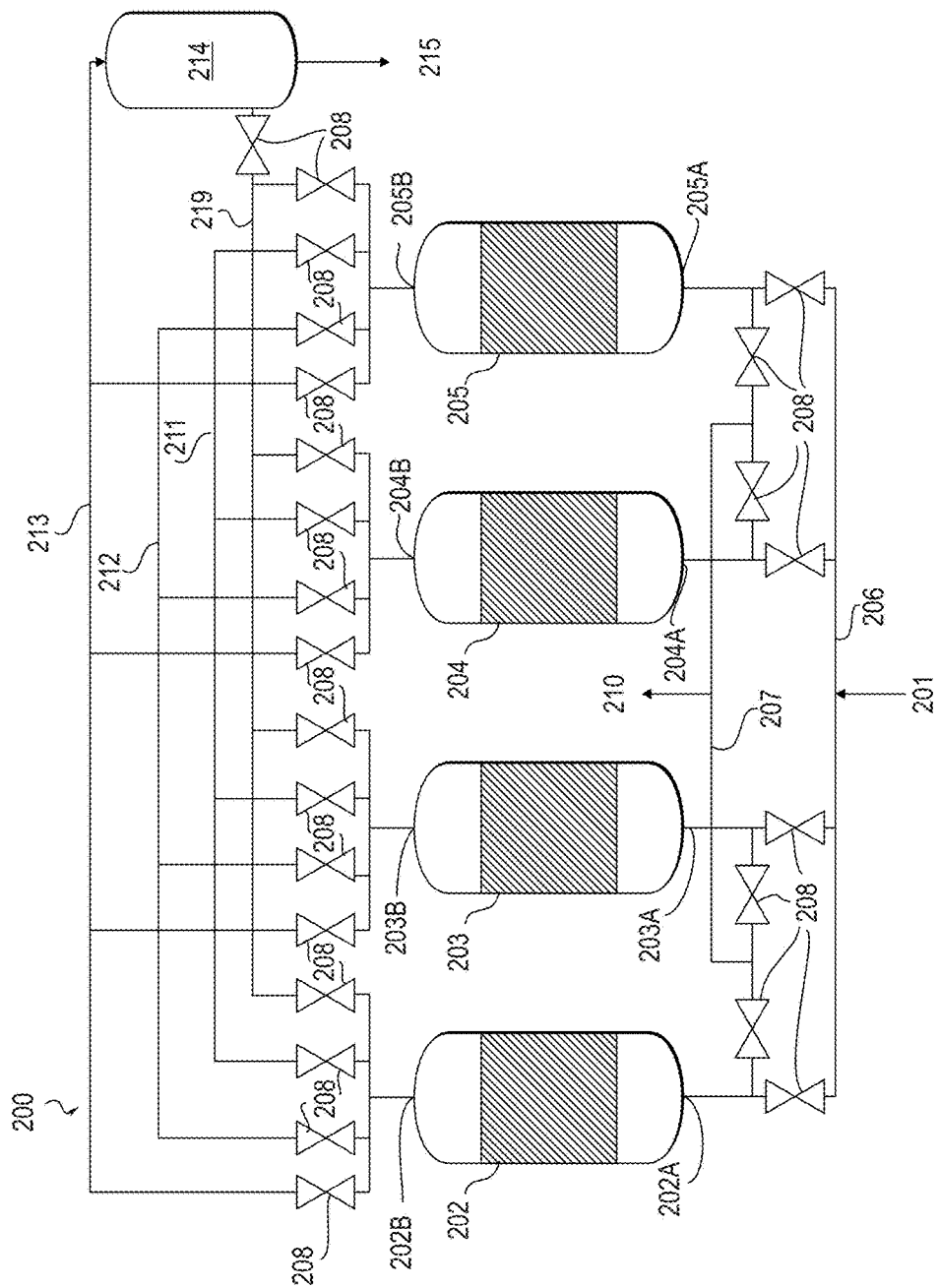
FIG. 11 is a schematic diagram illustrating a four bed PSA system.
Figure 12:
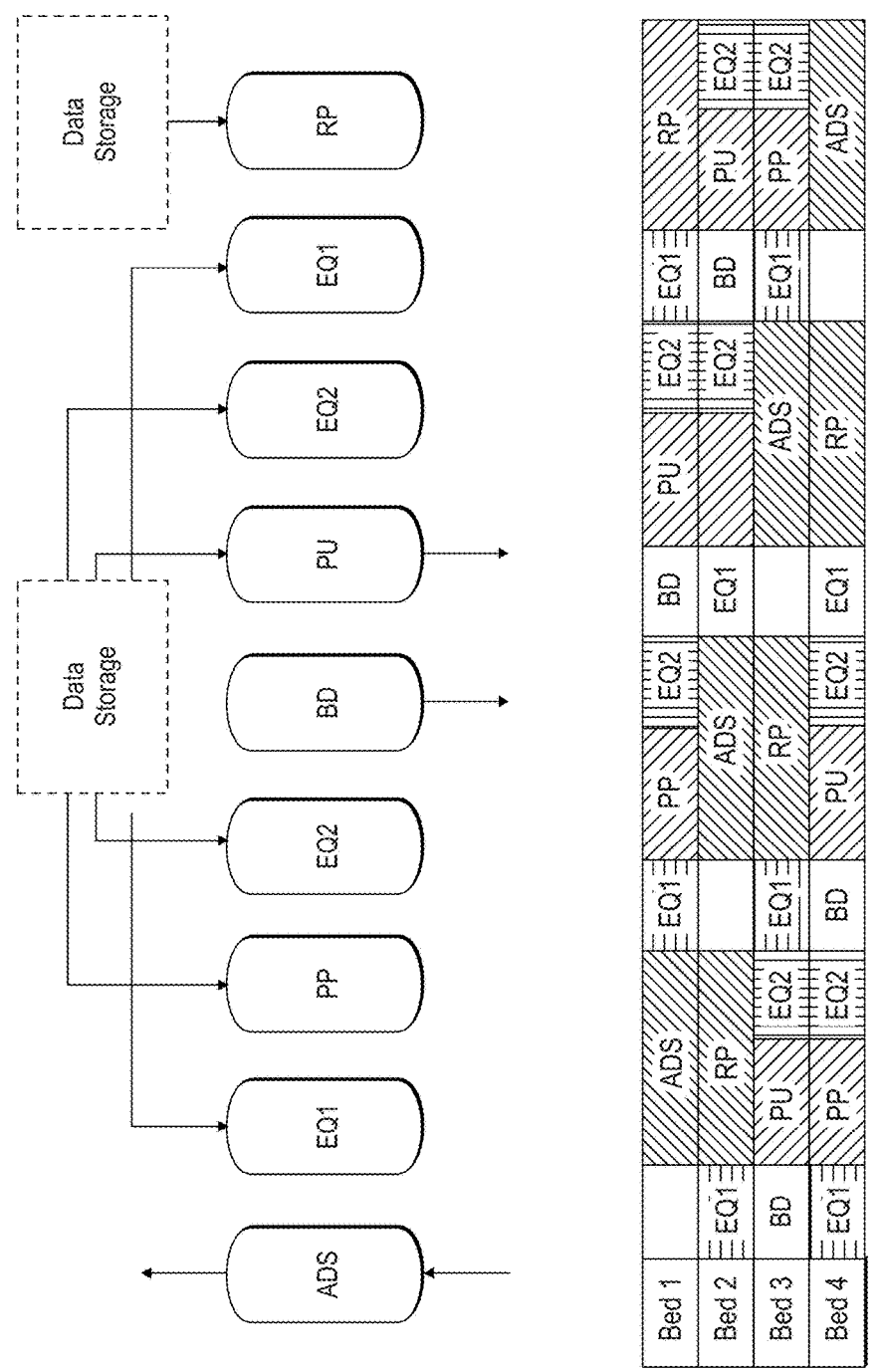
FIG. 12 is a schematic diagram of the bed interaction scheme for the four bed PSA shown in FIG. 11.

Referring to FIG. 11, here is shown an exemplary four-bed-PSA system (200). In this system, the four adsorbent beds are fluidly connected to each other and are controlled in such a way that each bed cycles through a sequence of operations, also referred to as steps. The cycles of the four beds are synchronized with respect to each other. The operation of this exemplary four-bed-PSA system (200) is similar to the operation of the exemplary two bed PSA system (100) with two beds, described previously. A contaminated gas (201), similar to the feed gas stream (101), is fed into a first connecting line (206), having valves (208) therein. The valves (208) are block valves (105). There are four adsorption columns: the first bed (202), the second bed (203), the third bed (204) and the fourth bed (205). The first bed (202) has a first bed inlet (202A) and a first bed outlet (202B). The second bed (203) has a second bed inlet (203A) and a second bed outlet (203B). The third bed (204) has a third bed inlet (204A) and a third bed outlet (204B). The fourth bed (205) has a fourth bed inlet (205A) and a fourth bed outlet (205B). The bed inlets and outlets are at opposite ends of each of the beds. The first connecting line (206) connects the first bed inlet (202A), the second bed inlet (203A), the third bed inlet (204A), and the fourth bed inlet (205A). A second connecting line (207) is fluidly connected to the first connecting line (206) and also connects the first bed inlet (202A), the second bed inlet (203A), the third bed inlet (204A), and the fourth bed inlet (205A). The second connecting line (207) has an outlet for exiting tail gas (210). The first bed (202) has a first bed outlet (202B), the second bed (203) has a second bed outlet (203B), the third bed (204) has a third bed outlet (204B), and the fourth bed (205) has a fourth bed outlet (205B). All four of the product ends of each bed are connected by a third connecting line (211), a fourth connecting line (212), a fifth connecting line (213), and a sixth connecting line (219). Valves (208) are placed at multiple locations between the different lines to control the flow of effluents from the various beds shown. The sixth connecting line (219) and the fifth connecting line (213) are connected with a product gas buffer chamber (214). The product gas buffer chamber (214) is optional. The product gas buffer chamber (214), similar to the product gas buffer tank (114), allows controlled purging and repressurization steps. Eluted product gas (215) is shown in the drawing as exiting the product gas buffer chamber (214).

In one embodiment, the at least two beds of the one or more adsorbent particles are four beds of the one or more adsorbent particles, and the product gas stream contains at least about 80 mol % of the methane recovered from the feed gas stream and at least about 40 mol % of the ethane recovered from the feed gas stream.

In one embodiment, wherein the at least two beds of the one or more adsorbent particles are four beds, the method further comprises:

a. following a first adsorption step in a first bed of the four beds, a first equalization step occurs wherein the first bed is allowed to equalize in pressure with a second bed of the four beds having a lower pressure than the first bed through a first line connecting the product end of the first bed and the product end of the second bed;

b. following the first equalization step, lowering pressure in the first bed and passing a gas from the first bed to a third bed of the four beds through a second line connecting the product end of the first bed and the product end of the third bed in a providing purge step such that the third bed of the four beds is purged;

c. following the providing purge step, a second equalization step occurs wherein the first bed is allowed to equalize in pressure with the third bed of the four beds having a lower pressure than the first bed through a third line connecting the product end of the first bed and the product end of the third bed;

d. following the second equalization step, depressurizing the first adsorbent bed to a pressure from about 6.89 kPa to about 138 kPa through the feed end of the first adsorbent bed in a blowdown step comprising either:

i) allowing the gas in the first adsorbent bed to vent to a purge tank; or ii) using a vacuum pump to lower the pressure of the first adsorbent bed;

e. following the blowdown step, the first bed is purged in a purging step wherein the gas is provided to the first bed through the product end of the first bed from a fourth bed of the four beds while the first bed is at a pressure from about 6.89 kPa to about 138 kPa and gas is purged through the feed end of the first bed;

f. following the purging step, a third equalization step occurs wherein the first bed is allowed to equalize in pressure with the fourth bed having a higher pressure than the first bed through a fourth line connecting the product end of the first bed and the product end of the fourth bed;

g. following the third equalization step, a fourth equalization step occurs wherein the first bed is allowed to equalize with the second bed having a higher pressure than the first bed through a fifth line connecting the product end of the first bed and the product end of the second bed;

h. following the fourth equalization step, passing a slipstream of a product-gas or a stream of a storage gas from a storage tank through the product end of the first bed to repressurize the first bed to an adsorption-step-pressure in a repressurization step; and i. following the repressurization step, operating the first bed in an independent adsorption step for a sufficient period of time for the third bed and the fourth bed to be equalized in pressure and the second bed to be depressurized prior to beginning a second adsorption step;

wherein the second bed, the third bed, and the fourth bed are sequenced to cycle through the adsorption step, the first equalization step, providing purge step, the second equalization step, blowdown step, purging step, the third equalization step, the fourth equalization step and independent adsorption step in the same order as the first bed.

One advantage for the methods disclosed herein can be their short total cycle time. In one embodiment, wherein the method utilizes four beds as described previously, the first adsorption step, the first equalization step, the providing purge step, the second equalization step, the blowdown step, the purging step, the third equalization step, the fourth equalization step and the independent adsorption step can occur in a total cycle time less than 100 minutes, such as in a total cycle time from 400 to 3600 seconds.

One advantage for the methods disclosed herein is that they can be performed in many different types of locations, including at refineries, at well heads, and even on offshore platforms or other remote locations. In one embodiment, the method is performed on an offshore platform.

Another advantage of the methods disclosed herein can be their reduced specific vacuum power consumption. In one embodiment, the specific vacuum power consumption is less than 2000 kWh/MMSCF of the feed gas stream, such as from about 0 to about 1500 kWh/MMSCF of the feed gas stream. The kilowatt hour (kWh) is a derived unit of energy equal to 3.6 megajoules.

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible subgeneric combinations of the listed components and mixtures thereof.

The invention illustratively disclosed herein suitably may be practiced in the absence of any element which is not specifically disclosed herein.

It should be noted that only the components relevant to the disclosure are shown in the figures, and that many other components normally part of a pressure swing adsorption (PSA) or vacuum swing adsorption (VSA) system are not shown for simplicity.

EXAMPLES

Example 1: Preparation of Zeolite SSZ Adsorbent Particles

Na-SSZ-36 powder was synthesized based on procedures described in U.S. Pat. No. 5,939,044 to produce an ITE/RTH intergrown zeolite structure having a Si:Al mole ratio of 15.6:1. Na-SSZ-39 powder was synthesized based on procedures described in U.S. Pat. No. 5,958,370 to produce a AEI zeolite structure having a Si:Al mole ratio of 12.3:1. Na-SSZ-45 powder was synthesized based on procedures described in U.S. Pat. No. 6,033,643 to produce a EEI zeolite structure having a Si:Al mole ratio greater than 200:1. All three of these zeolite powders were made into homogeneous mixtures of the zeolites with binders, and the homogeneous mixtures were pressed into pellets to make the adsorbent particles. None of the adsorbent particles were coated with any additional materials. ITE/RTH, AEI, and EEI zeolite structures are described in the 2016 Database of Zeolite Structures, Zeolite Framework Types, at the following website: http://asia.iza-structure.org/IZA-SC/ft.php.

The three different adsorbent particles were characterized by t-plot micropore volume (MPV) analysis. Before the MPV analysis, the adsorbent particles were activated at 400° C. under flowing $N_2$ for 8 hours. The properties of these activated adsorbent particles are summarized in Table 1.

TABLE 1

| Sample | Zeolite Framework Structure | Si:Al Mole Ratio | MPV, cm³/g |
|---|---|---|---|
| Na-SSZ-36 | ITE/RTH | 15.6:1 | 0.22 |
| Na-SSZ-39 | AEI | 12.3:1 | 0.32 |
| Na-SSZ-45 | EEI | >200:1 | 0.14 |

Example 2: Equilibrium Gas Adsorption Measurements

Equilibrium gas adsorption measurements for $CO_2$, $CH_4$, $N_2$, $C_2H_6$, and $C_3H_8$ were made on a High Pressure Volumetric Analyzer (HPVA) 200-4 port volumetric system. Equilibrium vapor adsorption measurements for $H_2O$ were made on a Dynamic Vapor Sorption (DVS) vacuum gravimetric system. The prepared adsorbent particles described in example 1 were first activated at 300° C. to obtain their dry weight, then they were re-activated in the gas adsorption system. The gases used were $CO_2$, $CH_4$, $N_2$, $C_2H_6$, $C_3H_8$, and He (all 99.999%). The gas adsorptions were measured at 0-50 bar for $CO_2$, 0-65 bar for $CH_4$, 0-10 bar for $C_2H_6$, 0-65 bar for $N_2$, and 0-3 bar for $C_3H_8$. The gas adsorptions were measured at 30° C. to 80° C. The $H_2O$ vapor adsorptions were measured at lower pressures, up to 280 mbar, due to limitations in generating vapor pressure up to 70° C.

Figure 2:
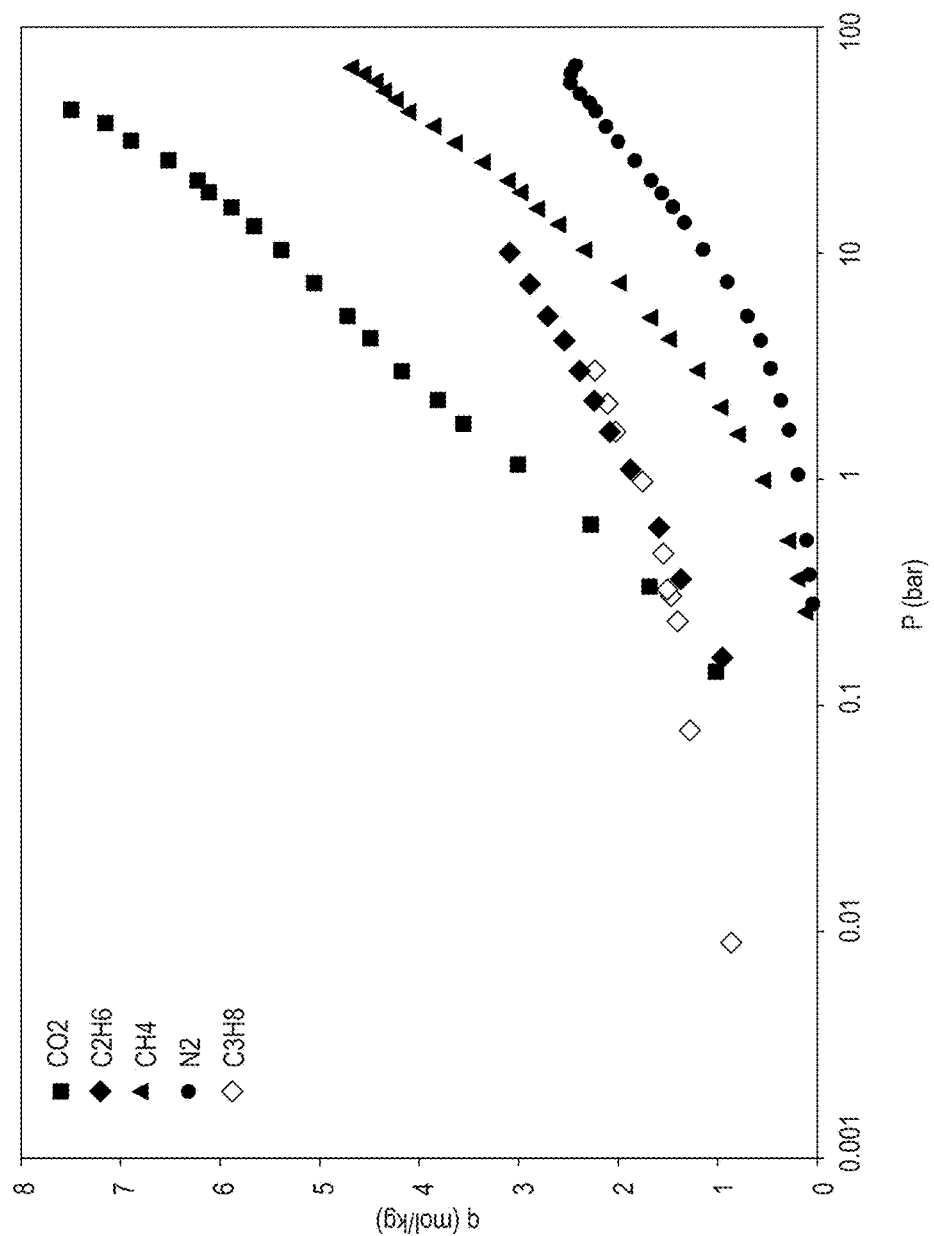
FIG. 2 is a plot of the equilibrium adsorption results for $CO_2$, $C_2H_6$, $CH_4$, $N_2$, and $C_3H_8$ on SSZ-39 at 30° C.
Figure 3:
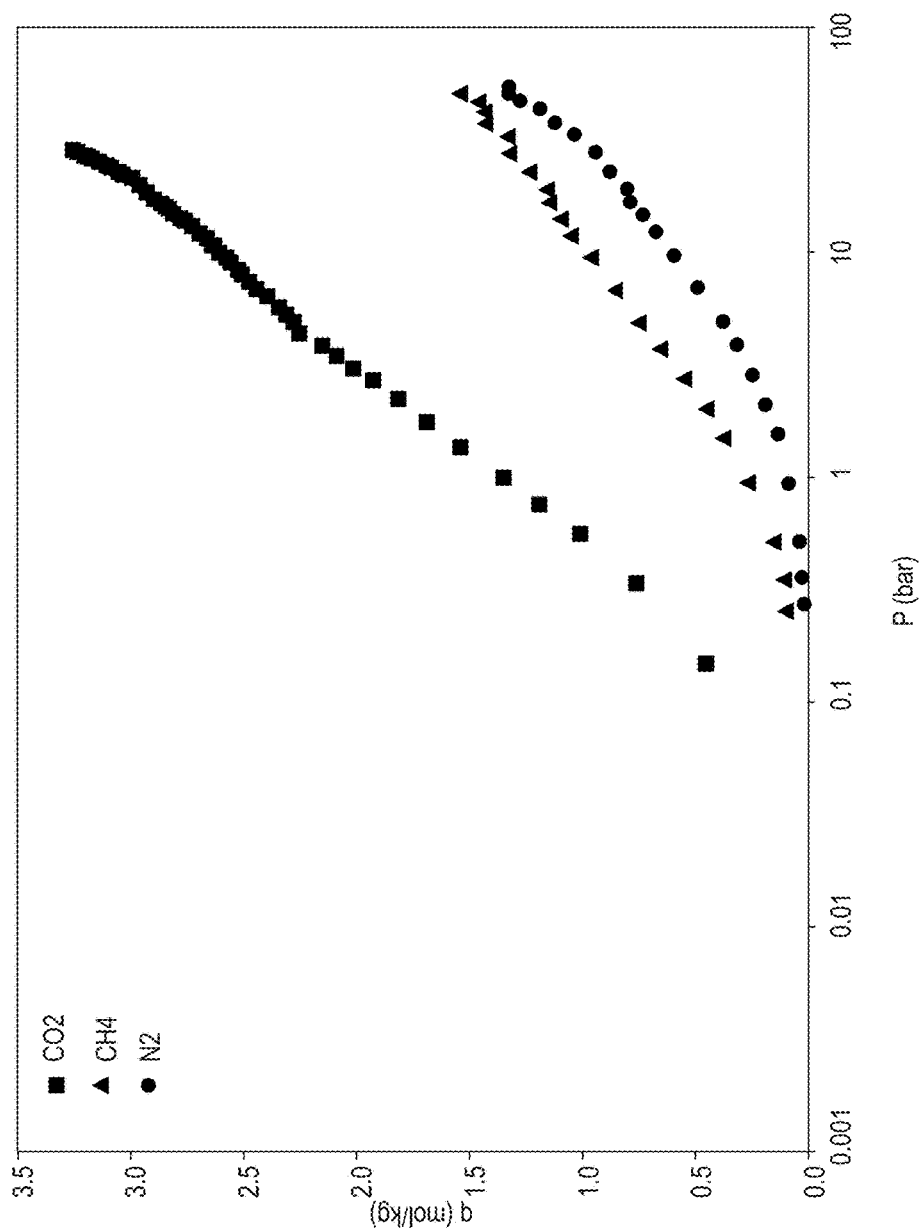
FIG. 3 is a plot of the equilibrium adsorption results for $CO_2$, $CH_4$, and $N_2$ on SSZ-45 at 30° C.

FIGS. 1 to 3 show the equilibrium adsorption results for these gas adsorption measurements. The gases measured in these tests represent either major hydrocarbon components or impurities found in most raw, or untreated, natural gases. These gases included $CO_2$, $CH_4$, $C_2H_6$, and $C_3H_8$, which make up about 60 to 90 vol % of typical raw natural gases. If an adsorbent is capable of separating $CH_4$, $C_2H_6$, and $C_3H_8$ from $CO_2$, then most of the hydrocarbons can be recovered. This is especially important in lean gas mixtures, where very little heavier hydrocarbon components are found.

Because the adsorbent particles had high Si:Al mole ratios, the $CO_2$ adsorption isotherms didn't show saturation at moderate temperatures until the $CO_2$ pressure reached above 10 bar. In the case of Na-SSZ-45, the saturation pressure for $CO_2$ was not even reached under our experimental conditions.

The $C_2H_6$ adsorption isotherms in FIGS. 1 and 2 showed much lower saturation pressures, with very little increase in adsorbed capacity above 1 bar of pressure. The $C_3H_8$ adsorption isotherms were very similar to the adsorption isotherms for $C_2H_6$.

Our measurements showed the adsorption affinity for Na-SSZ-36 had the order: $C_3H_8 > CO_2 \approx C_2H_6 > CH_4 > N_2$. The adsorption affinity for Na-SSZ-39 had the order: $H_2O > C_3H_8 > CO_2 > C_2H_6 > CH_4 > N_2$. The adsorption affinity for Na-SSZ-45 had the order: $H_2O > CO_2 > CH_4 > N_2$.

Example 3: Heats of Adsorption

Figure 5:
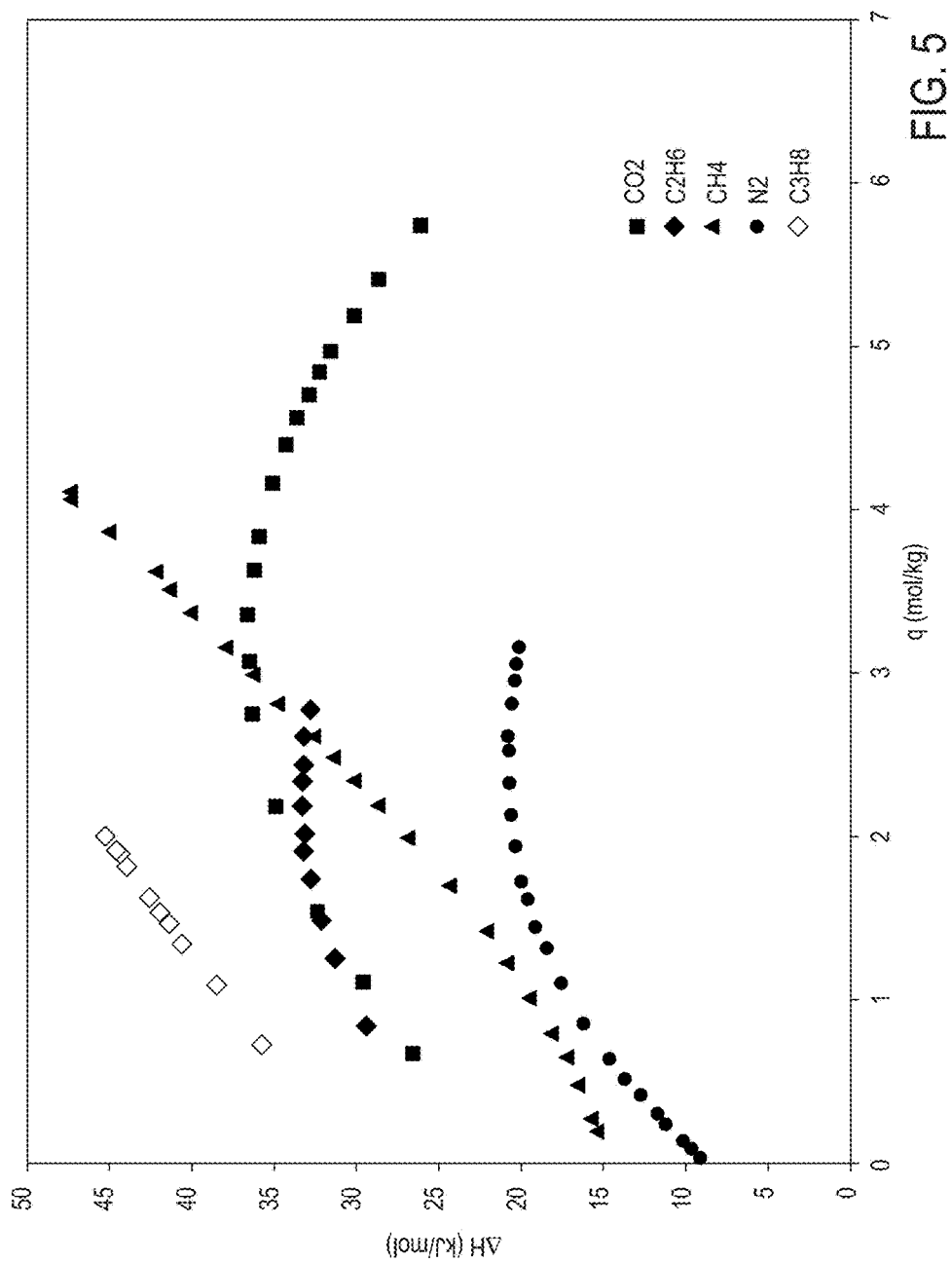
FIG. 5 is a plot of enthalpy of adsorption for $CO_2$, $C_2H_6$, $CH_4$, $N_2$, and $C_3H_8$ on SSZ-36.
Figure 6:
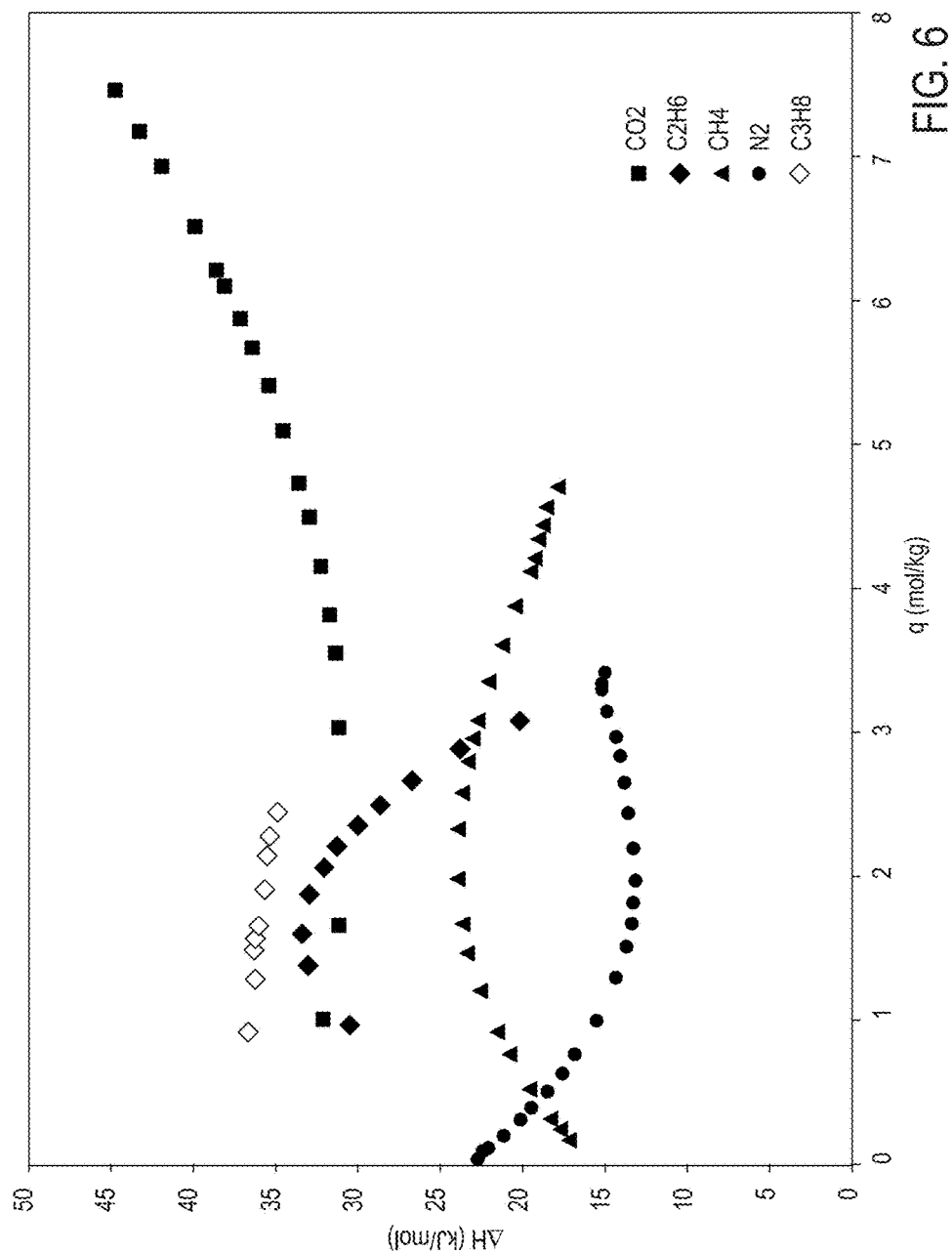
FIG. 6 is a plot of enthalpy of adsorption for $CO_2$, $C_2H_6$, $CH_4$, $N_2$, and $C_3H_8$ on SSZ-39.
Figure 7:
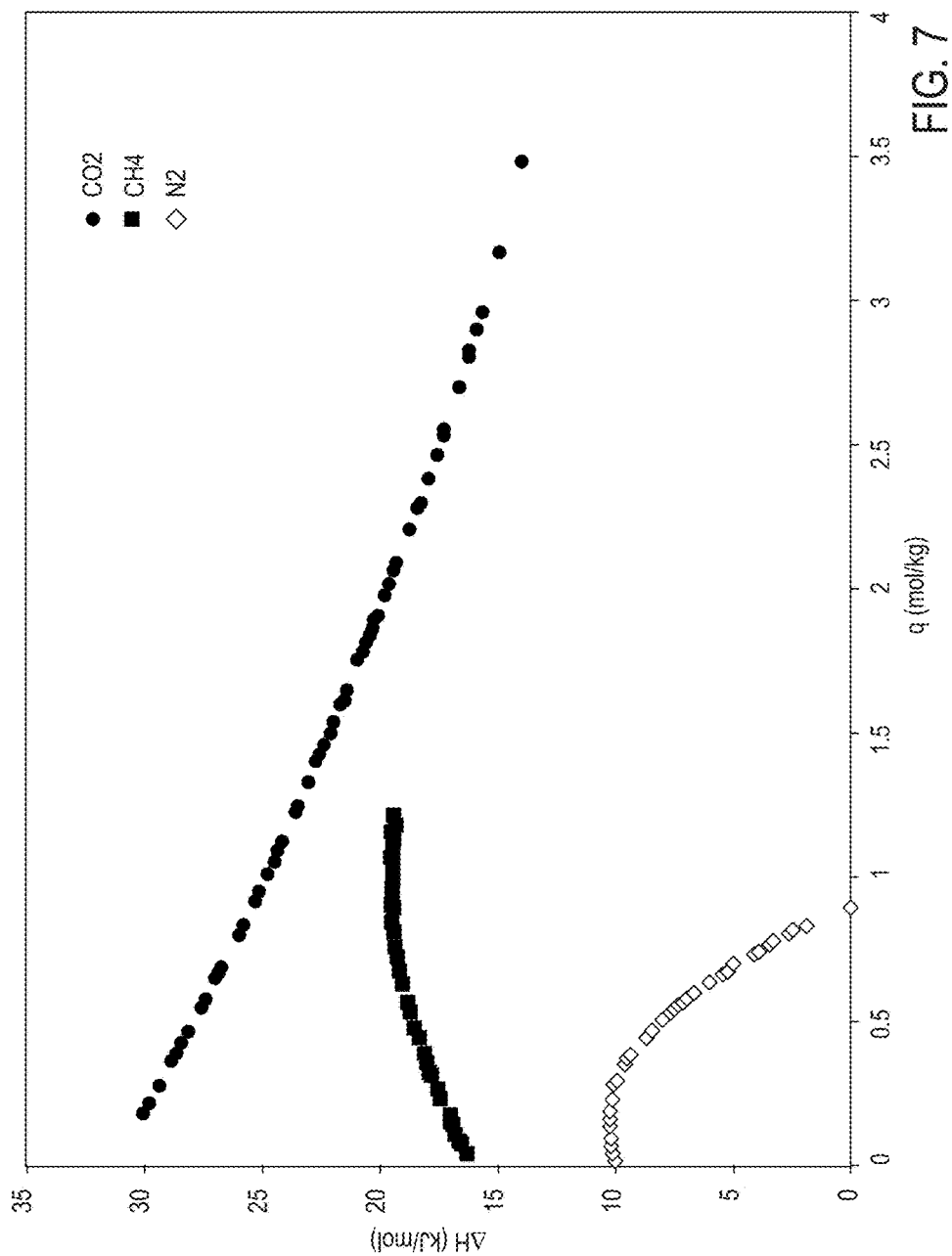
FIG. 7 is a plot of enthalpy of adsorption for $CO_2$, $CH_4$, and $N_2$ on SSZ-45.

Heats of adsorption of the various gases on the different zeolite particles were calculated from gas adsorption measurements and are shown in FIGS. 5, 6, and 7. Gases with lower molecular weight or lower polarity showed significantly lower enthalpies of adsorption. The heat of adsorption correlates with adsorption affinity. $H_2O$ has an extremely high polarity. When processing raw natural gas streams containing significant amounts of $CO_2$, $H_2S$, or $H_2O$, rises in temperature inside the adsorption bed when removing these components would be expected during the adsorption cycle.

Example 4: $H_2O$ Vapor Adsorption Measurements

Figure 4:
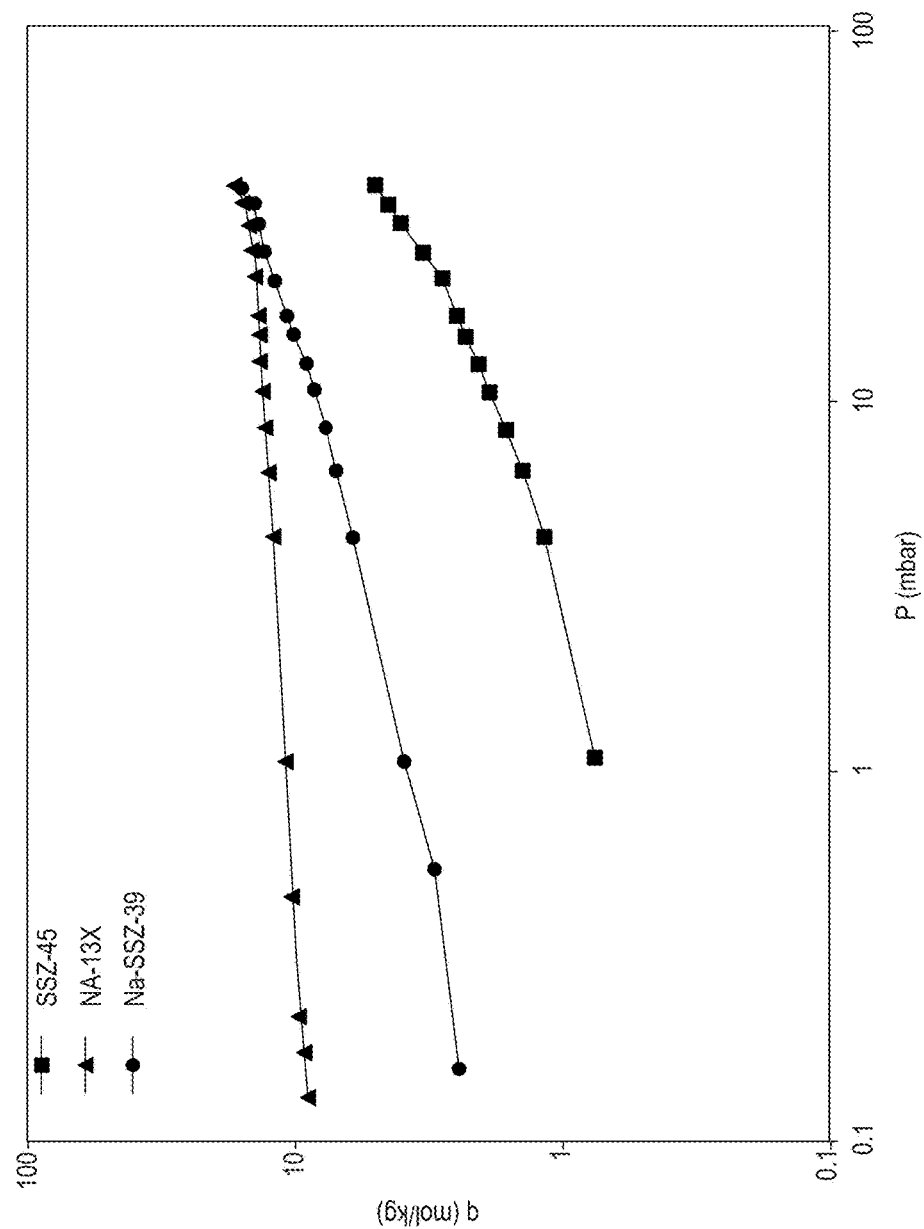
FIG. 4 is a plot of the $H_2O$ vapor adsorption of SSZ-39 and SSZ-45, compared with Na-13X.

Comparative adsorbent particles made with Na-13X having a Si:Al mole ratio of 1.5:1 were made and their $H_2O$ vapor adsorption isotherm was compared with those obtained with the adsorbent particles of Na-SSZ-45 and Na-SSZ-39, described in Example 1. FIG. 4 shows the $H_2O$ vapor adsorption isotherm results for these three different types of adsorbent particles.

Previous zeolite adsorbents used for acid gas removal from natural gas, such as zeolite 3A, zeolite 5A, zeolite Na-X, and zeolite Na-Y have had Si:Al mole ratios less than 5. These previous zeolite adsorbents had a high affinity for adsorbing $H_2O$ and also had limitations due to their propensity for significant temperature increases and significantly reduced $CO_2$ adsorption when water was adsorbed during the adsorption process.

Example 5: Effect of $H_2O$ on $CO_2$ Equilibrium Adsorption $H_2O$ and $H_2S$ are common impurities found in raw natural gas streams. When raw natural gas with these common impurities were treated using PSA or VSA processes using earlier adsorbents to reduce the contaminant these impurities lowered the adsorption performance. In the case of zeolite Na-13X, the presence of water lowered the adsorption capacity of the adsorbent by 70% or greater, depending on the partial pressure of $H_2O$ present in the gas. This feature is described in Y. Wang et al., "Adsorption Equilibrium of Binary Mixtures of Carbon Dioxide and Water Vapor on Zeolites 5A and 13X", J. Chem. Eng. Data, 2010, 55, 3189-3195.

The effect of increasing $H_2O$ loading on the $CO_2$ adsorption of Na-SSZ-39 was measured and is shown in FIG. 8. The measurement was done on a DVS Vacuum gravimetric adsorption microbalance. As the amount of water adsorbed was increased in the adsorbent particles, there was only a slight decrease in $CO_2$ adsorption capacity. At a loading of 0.7 mol $H_2O$/kg on the adsorbent particles, and at 1.0 bar pressure, there was approximately 15% less $CO_2$ adsorbed. Increasing the $H_2O$ loading further, to a very high amount of 4.4 mol $H_2O$/kg, only lowered by another 30% the amount of $CO_2$ that was adsorbed. This demonstrated that even at high water loading on the adsorbent particles, the adsorption of $CO_2$ remained effective when using the adsorbent particles having the Si:Al molar ratio greater than 5:1.

The retained $CO_2$ adsorption at high water loading on the adsorbent particles comprising zeolite SSZ-36, zeolite SSZ-39, or zeolite SSZ-45 was not appreciated previously and was unexpected.

Example 4: Pressure Swing Adsorption Process Performance

PSA and VSA modeling provides a target for actual process performance by predicting the expected hydrocarbon recovery and $CO_2$ removal for natural gas separations.

A PSA simulation was set up with the adsorption bed initially saturated with the feed gas at the feed pressure. Once the cyclic steady-state was determined by monitoring both the mass and thermal balance between cycles, the simulation was stopped, and all necessary parameters were recorded. The simulation took between 100 to 400 cycles to reach steady-state, depending on the process parameters being examined. The simulation approach used a data buffer strategy, combined with a single bed, to simulate the effect of changing gas concentrations entering and exiting the adsorbent bed.

Figure 10:
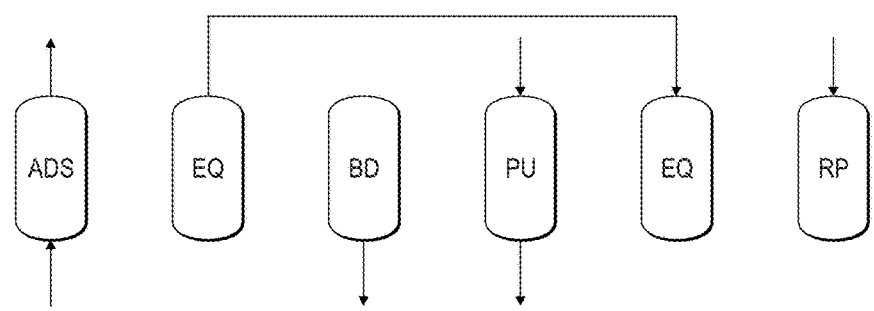
FIG. 10 is a schematic diagram of the bed interaction scheme for the two bed PSA shown in FIG. 9.

The two bed PSA system looked like the process diagram shown in FIG. 9, and described previously. FIG. 10 shows the general PSA cycle arrangement and bed interaction scheme for the exemplary two bed PSA system (100). In this figure, "ADS" refers to adsorption step, "EQ" refers to equalization step, "BD" refers to blowdown step, "PU" refers to purging step, and "RP" refers to re-pressurization step. PSA simulations using this two bed PSA system with Na-SSZ-36, Na-SSZ-36, or Na-SSZ-45 showed maximum recoveries of $CH_4$ to be 60 mol %.

The four bed PSA system looked like the process diagram shown in FIG. 11. The bed interaction scheme for this four bed PSA system is shown in FIG. 12. PSA simulations using this four bed PSA system with Na-SSZ-36, Na-SSZ-36, or Na-SSZ-45 showed improved recoveries of $CH_4$ over the two bed PSA system.

The step configuration in the bed interaction scheme for the four bed PSA system used in this example was adopted from earlier PSA separations for hydrogen purification, described in M. Luberti et al., "Design of a $H_2$ PSA for Cogeneration of Ultrapure Hydrogen and Power at an Advanced Integrated Gasification Combined Cycle with Pre-Combustion Capture", Adsorption, 2014, 20, 511-524. FIG. 12 shows how the four beds interacted with each other during the simulations, and where data storage was utilized. The total cycle time in the four bed PSA simulations was fixed at 800 seconds, with the adsorption time fixed at 200 seconds. By having the adsorption time at ¼th of the total cycle time, a continuous production of a high quality product gas stream was obtained.

Figure 13:
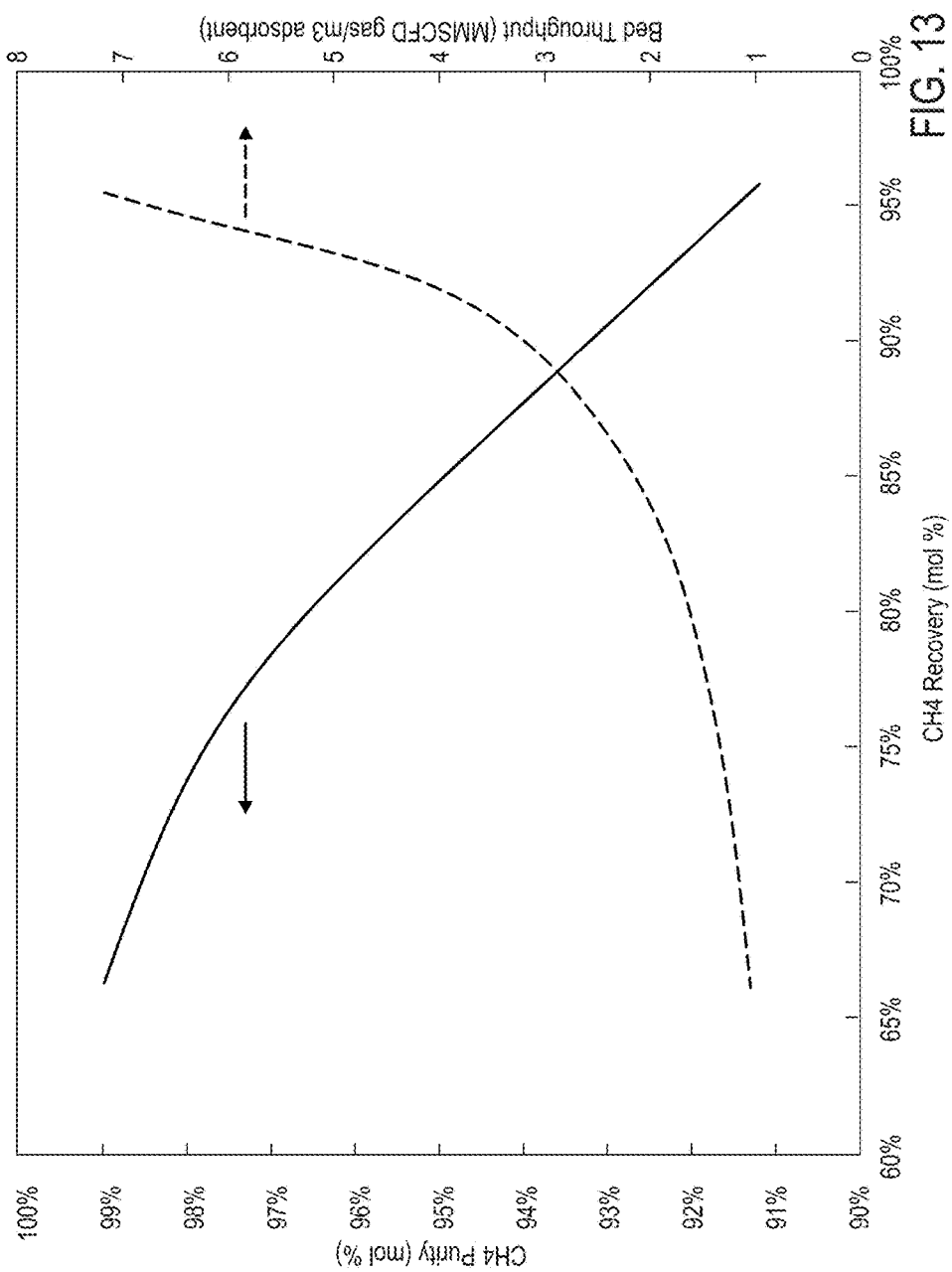
FIG. 13 is a plot of the adsorption cycle performance in a four bed PSA for zeolite SSZ-39.

The adsorption cycle performance of the four bed PSA system using Na-SSZ-39 was determined with a feed gas stream comprising 10 mol % $CO_2$, with the balance of the feed gas stream being $CH_4$. The feed pressure during these simulations was 70 bar (1000 psig). The desorption pressure in these simulations was set at 1 bar (0 psig) to simulate a PSA process for purifying high-pressure natural gas. The results of this simulation are shown in FIG. 13. FIG. 13 shows that increasing $CH_4$ product purity caused reduced $CH_4$ recovery, and increased $CH_4$ product purity causing reduced bed throughput. As the target $CO_2$ concentration changed, increasing the $CH_4$ purity of the product gas, the recovery of $CH_4$ was observed to decrease. For example, as the $CH_4$ product purity specification was increased to 98 mol %, the bed throughput decreased to approximately 1.25 MMSCFD gas/$m^3$ adsorbent.

It is claimed:

1. A method for removing a contaminant comprising a water from a feed gas stream that includes the contaminant, a methane and an ethane, comprising:
   alternating an input of the feed gas stream between an at least two beds of adsorbent particles made from a homogeneous mixture, wherein the adsorbent particles comprise a zeolite SSZ-36, a zeolite SSZ-39, a zeolite SSZ-45, or a combination thereof;
   wherein the feed gas stream contacts one of the at least two beds at a given time by an adsorption step and a tail gas stream is simultaneously vented from another of the at least two beds by a desorption step;
   wherein a contacting in the one of the at least two beds occurs at a feed pressure of from about 345 kPa to about 6895 kPa for a sufficient time to preferentially adsorb the contaminant from the feed gas stream and thereby producing a product gas stream containing no greater than about 2 mol % carbon dioxide, at least about 10 wppm of the water, at least about 65 mol % of the methane recovered from the feed gas stream, and at least about 25 mol % of the ethane recovered from the feed gas stream; and
   wherein the feed gas stream is input at a feed end of each of the at least two beds, the product gas stream is removed from a product end of each of the at least two beds, and the tail gas stream is vented from the feed end of the at least two beds.

2. The method of claim 1, wherein the water is adsorbed by the at least two beds of the adsorbent particles and a $CO_2$ adsorption capacity of the one or more adsorbent particles is lowered by less than 30 mol %.

3. The method of claim 1, wherein the at least two beds of the adsorbent particles are four beds of the adsorbent particles and the product gas stream contains at least about 80 mol % of the methane recovered from the feed gas stream and at least about 40 mol % of the ethane recovered from the feed gas stream.

4. The method of claim 1, wherein the feed gas stream comprises the carbon dioxide, from 20 to 5000 wppm of the water, and from 0 to 1000 wppm hydrogen sulfide.

5. The method of claim 1, wherein the feed gas stream comprises an acid gas selected from the group consisting of the carbon dioxide, a hydrogen sulfide, a carbonyl sulfide, and combinations thereof.

6. The method of claim 1, wherein the zeolite SSZ-36 or the zeolite SSZ-39 has a Si:Al mole ratio of from 5 to 100.

7. The method of claim 1, wherein the zeolite SSZ-45 has a Si:Al mole ratio from 101 to 400.

8. The method of claim 1, wherein the feed gas stream has a flow rate of from 1 to 100 MMSCFD during the adsorption and the adsorption occurs at an adsorption-temperature from 20 to 80° C.

9. The method of claim 1, wherein the product gas stream comprises at least about 20 wppm of the water, at least about 95 mol % total-methane, and at least about 3 mol % total-ethane.

10. The method of claim 1, wherein the product gas stream contains no greater than about 50 wppm hydrogen sulfide.

11. The method of claim 1, wherein the product gas stream contains no greater than about 4 wppm hydrogen sulfide and no greater than about 2000 wppm of the water.

12. The method of claim 1, wherein the zeolite SSZ-36 has a cation as a framework ion and the cation is selected from the group consisting of a sodium, a calcium, a potassium, a lithium, a magnesium, and a barium.

13. The method of claim 12, wherein the cation is the sodium.

14. The method of claim 1, wherein the zeolite SSZ-39 has a cation as a framework ion and the cation is selected from the group consisting of a sodium, a calcium, a potassium, a lithium, a magnesium, and a barium.

15. The method of claim 14, wherein the cation is the sodium.

16. The method of claim 1, wherein the zeolite SSZ-45 has a cation as a framework ion and the cation is selected from the group consisting of a sodium, a calcium, a potassium, a lithium, a magnesium, and a barium.

17. The method of claim 1, wherein the method utilizes two beds of the one or more adsorbent particles, and further comprising:
   a. following the adsorption step in one of the two beds and a simultaneous desorption step in the other of the two beds, equalizing a pressure of the one of the two beds and the other of the two beds through the product end of each of the one of the two beds and the other of the two beds at an end of the adsorption and the simultaneous desorption step; and
   b. re-pressurizing the other of the two beds having just completed the simultaneous desorption step by sending a slipstream of the product gas stream through the product end of the other of the two beds having just completed the simultaneous desorption step.

18. The method of claim 1, wherein the at least two beds of the one or more adsorbent particles are four beds; further comprising:
   a. following a first adsorption step in a first bed of the four beds, a first equalization step occurs wherein the first bed is allowed to pressure equalize with a second bed of the four beds having a lower pressure than the first bed through a first line connecting the product end of the first bed and the product end of the second bed;
   b. following the first equalization step, lowering the feed pressure in the first bed and passing a gas from the first bed to a third bed of the four beds through a second line connecting the product end of the first bed and the product end of the third bed in a providing purge step such that the third bed of the four beds is purged;
   c. following the providing purge step, a second equalization step occurs wherein the first bed is allowed to pressure equalize with the third bed of the four beds having the lower pressure than the first bed through a third line connecting the product end of the first bed and the product end of the third bed;
   d. following the second equalization step, depressurizing a first adsorbent bed to the feed pressure from about 6.89 kPa to about 138 kPa through the feed end of the first adsorbent bed in a blowdown step comprising either:
      i) allowing the gas in the first adsorbent bed to vent to a purge tank; or
      ii) using a vacuum pump to lower the feed pressure of the first adsorbent bed;
   e. following the blowdown step, the first bed is purged in a purging step wherein the gas is provided to the first bed through the product end of the first bed from a fourth bed of the four beds while the first bed is at the feed pressure from about 6.89 kPa to about 138 kPa and gas is purged through the feed end of the first bed;
   f. following the purging step, a third equalization step occurs wherein the first bed is allowed to pressure equalize with the fourth bed having a higher pressure than the first bed through a fourth line connecting the product end of the first bed and the product end of the fourth bed;
   g. following the third equalization step, a fourth equalization step occurs wherein the first bed is allowed to equalize with the second bed having the higher pressure than the first bed through a fifth line connecting the product end of the first bed and the product end of the second bed;
   h. following the fourth equalization step, passing a slipstream of a product-gas or a stream of a storage gas from a storage tank through the product end of the first bed to repressurize the first bed to an adsorption-step-pressure in a repressurization step; and
   i. following the repressurization step, operating the first bed in an independent adsorption step for a sufficient period of time for the third bed and the fourth bed to be pressure equalized and the second bed to be depressurized prior to beginning a second adsorption step;
wherein the second bed, the third bed, and the fourth bed are sequenced to cycle through the first adsorption step, the first equalization step, the providing purge step, the second equalization step, the blowdown step, the purging step, the third equalization step, the fourth equalization step and the independent adsorption step in the same order as the first bed.

19. The method of claim 18, wherein the first adsorption step, the first equalization step, the providing purge step, the second equalization step, the blowdown step, the purging step, the third equalization step, the fourth equalization step and the independent adsorption step occur in a total cycle time of from 400 to 3600 seconds.

20. The method of claim 1, wherein the method is performed on an offshore platform.

21. The method of claim 1, wherein the method has a specific vacuum power consumption of from about 0 to about 1500 kWh/MMSCF of the feed gas stream.

22. The method of claim 1, wherein from greater than 0 wt % to about 50 wt % of the tail gas stream is recycled to the feed gas stream; thereby producing the product gas stream containing no greater than about 2 mol % of the carbon dioxide, at least about 90 mol % of the methane in the feed gas stream, and at least about 85 mol % of total hydrocarbons in the feed gas stream.

23. A method for removing a contaminant from a feed gas stream, wherein the feed gas stream includes a methane, an ethane, a carbon dioxide, from 20 to 10,000 wppm water, and from 4 to 1000 wppm hydrogen sulfide, comprising:

alternating an input of the feed gas stream between an at least two beds of one or more adsorbent particles made from a homogeneous mixture, wherein the one or more adsorbent particles comprise a zeolite SSZ-36, a zeolite SSZ-39, a zeolite SSZ-45, or a combination thereof;

wherein the feed gas stream contacts one of the at least two beds at a given time in an adsorption step and a tail gas stream is simultaneously vented from another of the at least two beds in a desorption step;

wherein a contacting in the one of the at least two beds occurs at a feed pressure of from about 345 kPa to about 6895 kPa for a sufficient time to preferentially adsorb the contaminant from the feed gas stream; thereby producing a product gas stream containing no greater than about 2 mol % of the carbon dioxide, at least about 10 wppm of the water, at least about 65 mol % of the methane recovered from the feed gas stream, at least about 25 mol % of the ethane recovered from the feed gas stream, no greater than about 1 wppm of the hydrogen sulfide, and no greater than about 1 wppm carbonyl sulfide; and wherein the feed gas stream is input at a feed end of each of the at least two beds, the product gas stream is removed from a product end of each of the at least two beds, and the tail gas stream is vented from the feed end of the at least two beds.

* * * * *